Nov. 5, 1935.  H. E. RHODES  2,019,994
ART OF PRODUCING ELECTROLYTIC CELLS
Filed Oct. 26, 1932  2 Sheets-Sheet 1
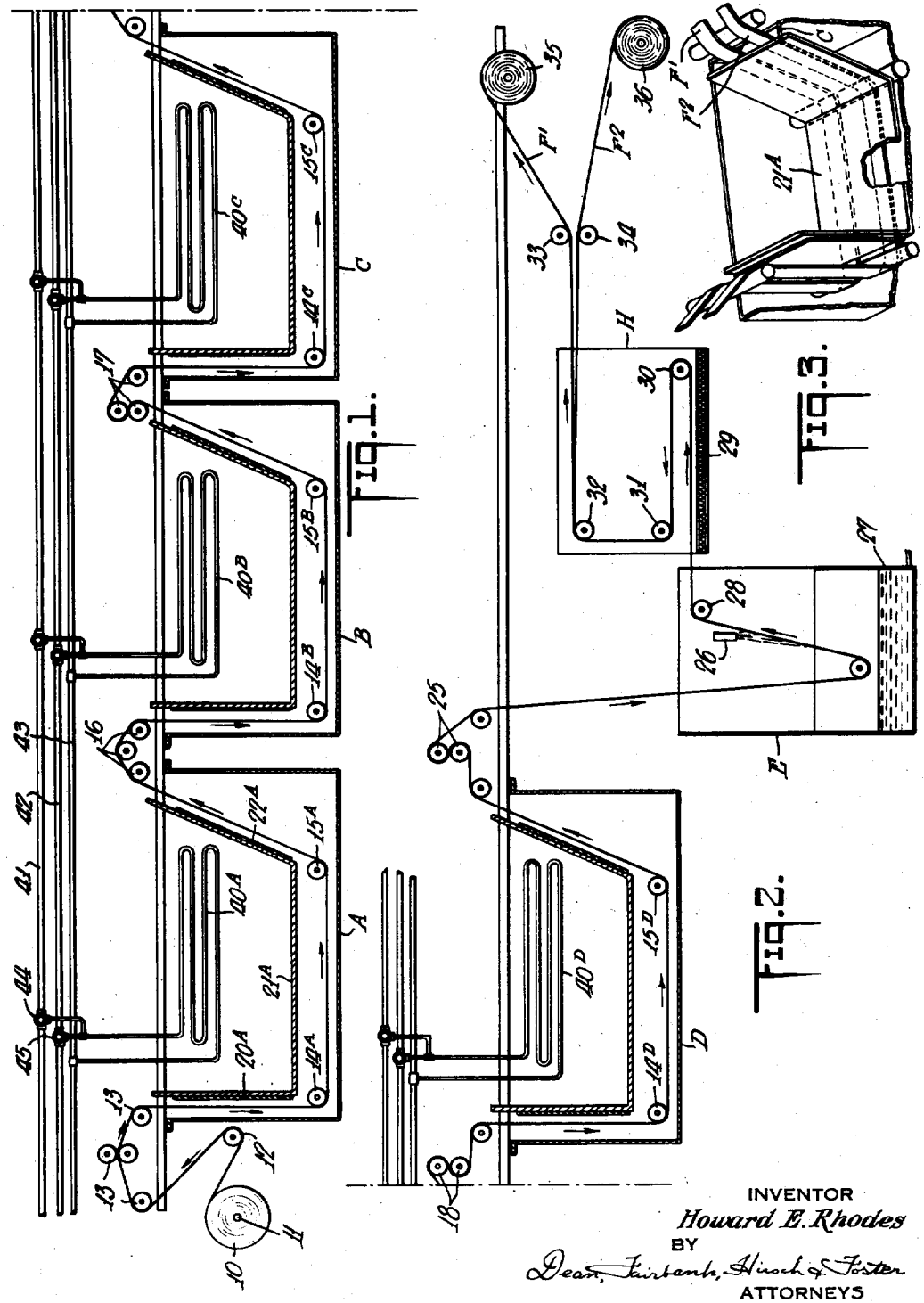
INVENTOR
Howard E. Rhodes
BY
Dean, Fairbanks, Hirsch & Foster
ATTORNEYS Nov. 5, 1935.  H. E. RHODES  2,019,994
ART OF PRODUCING ELECTROLYTIC CELLS
Filed Oct. 26, 1932    2 Sheets-Sheet 2
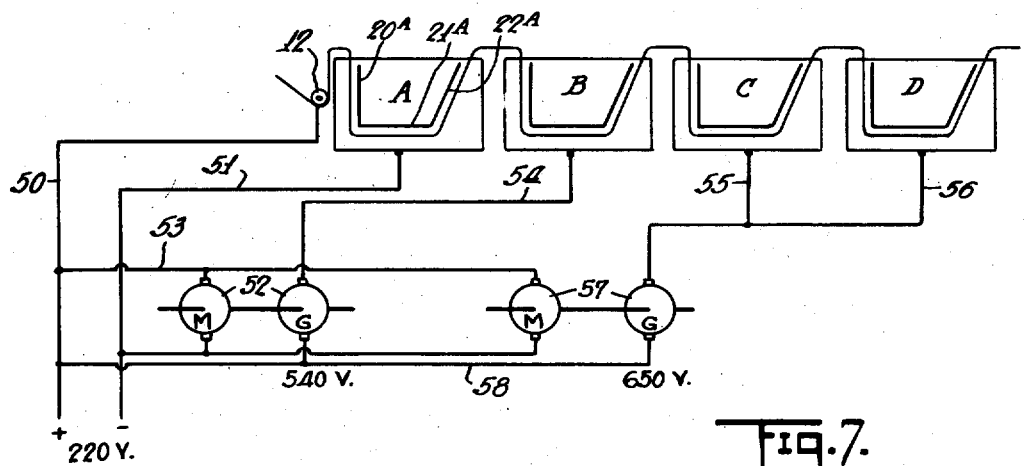
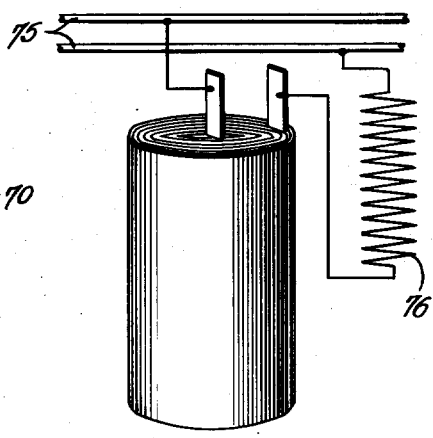
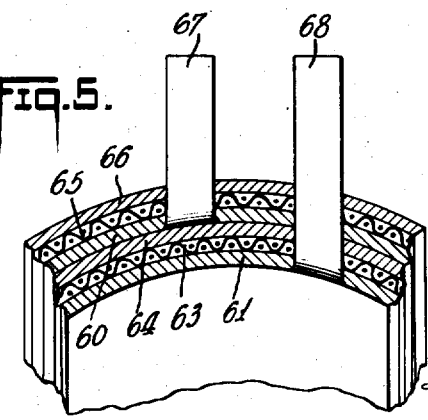
INVENTOR
*Howard E. Rhodes*
BY
ATTORNEYS Patented Nov. 5, 1935

2,019,994

UNITED STATES PATENT OFFICE 2,019,994

ART OF PRODUCING ELECTROLYTIC CELLS

Howard E. Rhodes, Floral Park, N. Y., assignor to Aerovox Corporation, a corporation of New York Application October 26, 1932, Serial No. 639,660

27 Claims. (Cl. 175—315)

My present invention relates to electrolytic cells and more especially to electrolytic condensers, and while in its broadest aspects it is applicable to such condensers of the wet type, it is more especially concerned with condensers of the so-called dry type in which substantially all of the electrolyte is soaked up or incorporated in a spacer or fibrous interlay between the electrodes, and the invention is more especially applicable though not limited to such condensers of the high voltage type, that is of type such as to operate on voltages of 500, 600 or more.

An object of the invention is the production of a cell or condenser of the above characteristics having low leakage and low power factor and long life, which can be produced expeditiously and with the use of simple equipment and the need for but little supervision.

According to the invention the foil is rapidly formed in the presence of a low resistance aqueous electrolyte under progressively higher voltage, to a maximum considerably in excess of the operating voltage of the condenser or cell. In a specific application to aluminum foil a film-forming sodium salt electrolyte is first employed and applied hot to expedite the forming, and this is followed by a film-forming ammonium salt electrolyte applied at higher voltages but at lower temperature.

After the condenser construction has been completed, with the preformed aluminum foil as one or both of the electrodes, there is incorporated therein a high resistance electrolyte of the general character set forth in the prior patent to Alexander Georgiev No. 1,815,768 of July 21, 1931.

According to another feature the latter electrolyte is heated until its boiling point is the minimum capable of building a film to withstand the operating voltage of the condenser, and the condenser is formed in said electrolyte to slightly in excess of the operating voltage thereof.

In the accompanying drawings, in which is shown one or more of various possible embodiments of the several features of the invention, Fig. 1 is a diagrammatic view of a substantial part of the installation for preforming the foil.

Fig. 2 is a view similar to Fig. 1 of the remaining portion of the preforming installation, Fig. 3 is a perspective view of one of the tanks showing the relation between the foil and the cathode strip.

Fig. 4 is a circuit diagram of the electrical connections for the preforming operation, Fig. 5 is a fragmentary diagrammatic view of a condenser roll construction, Fig. 6 is a diagrammatic view showing the condenser impregnation, and Fig. 7 is a diagrammatic view showing the final forming of the condenser.

In the particular embodiment of installation diagrammatically disclosed in Figs. 1 to 3, there are four preforming tanks of aluminum mounted preferably in alignment with each other and identified respectively by reference characters A, B, C and D.

The stock of aluminum foil to be treated is mounted on a supply roll 10 at one end of the installation. In practice two such rolls are placed in side by side relation on a common shaft 11 for concurrent treatment of two aluminum strips. The strips are passed over a copper roll 12 and thence over a series of guide rolls 13 downward into the first tank A, a pair of rollers 14a and 15a guiding the strip along the bottom of the tank, and thence obliquely upward past guide rolls 16 and thence downward into the second tank B, from which the strips are led past rolls 17 to the third tank C, and thence past guide rolls 18 to the fourth tank D. The four tanks are identical, each being provided with guide rolls near the bottom thereof, corresponding reference numerals designating corresponding parts with the respective exponents A, B, C and D.

Mounted in each of the tanks is an aluminum cathode strip, the strips in the several tanks being designated by the same reference numerals with exponents A, B, C and D respectively. The cathode strip in tank A has a vertical segment 20$^A$ closely contiguous to the downward run of the foil being fed therethrough, a horizontal segment 21$^A$ closely contiguous to the longitudinal run of the foil, and an oblique segment 22$^A$ closely contiguous to the advance run of the foil, which leads to the succeeding tank. As best shown in the perspective view, of Fig. 3 this aluminum cathode member is somewhat wider than the combined width of the aluminum foils F1 and F2 being treated, and in each case is electrically connected to the tank as shown diagrammatically at C in Fig. 3.

The foil, after leaving the final tank D, is passed by a series of guide rollers 25, downward into a wash tank E, hot water being sprayed through a nozzle 26 over the surface of the foil as it is passed through said tank, the wash water being drained off at 27 from the bottom of the tank.

The foil is thence passed by roller 28 into a drying chamber H across the bottom of which there is illustratively shown a heating coil 29 past which the foil is drawn, a series of rollers 30, 31 and 32 passing the foil in several runs through the chamber so that it becomes adequately dried. The foils thence are led past rollers 33 and 34 to be wound on delivery reels 35 and 36 respectively from which the thus pretreated foil can later be cut and made up into the condensers or other electrolytic cells.

The equipment also includes temperature controlling means for each tank. This means in the embodiment shown comprises heat-interchange coils 40A, 40B, 40C and 40D respectively, one within each tank. Each coil 40 is connected to three supply pipes running the length of the installation, a hot water pipe 41, a cold water pipe 42 and a return pipe 43. Valves 44 and 45 respectively control the delivery of hot or cold water as required to the heat-interchange coil 40.

Appropriate drive means, preferably an electric motor (not shown) is employed for taking the foils F1 and F2 from off the supply reels 10 and passing it successively through the tanks, illustratively at rate of about ten feet per minute and for collecting the foil on the delivery reels 35 and 36.

In the embodiment shown, illustratively for preforming the aluminum foil for an electrolytic condenser to be used at a voltage of 500 volts, there is employed in the tanks A and B an electrolyte including sodium borate, commonly known as borax, boric acid and distilled water. In a desirable embodiment the proportions of the ingredients are 2.1 grams of borax and 66.6 grams of boric acid to one liter of distilled water.

In the third and fourth tanks, C and D respectively, there is used a preforming electrolyte of different composition including ammonium instead of sodium ingredients. In a preferred embodiment this electrolyte may be prepared from a concentrated solution comprising 120 grams of boric acid and 14 cc. of 26% ammonium water to one liter of distilled water. The solution in the third tank C is prepared by diluting one part of this concentrated solution with approximately 100 parts of distilled water, and that in the fourth tank D, by diluting one part of said concentrated solution with approximately 200 parts of distilled water.

In the embodiment shown, the temperature of the electrolytes in the respective tanks is controlled by means of the heat-interchange coils 40 previously referred to. Preferably the temperature in tanks A, C and D is maintained at about 170 degrees F., while the temperature in tank B is kept at 200 to 212 degrees F. This control of temperature may be effected by a custodian observing and reading thermometers at the several tanks and correspondingly manipulating the hot water valve 44 or cold water valve 45 as the case may be, for each of the respective tanks to maintain approximately the correct temperature therein. Of course this can be accomplished by well-known thermostatic control apparatus, which need not be described, as it constitutes no part of the invention.

The voltages impressed on the foil for preparing the particular condenser set forth are also predetermined. At the foil as it passes through tank A the impressed voltage may be that of the commercial electric power and light circuit, say 220 volts direct current. At tank B this voltage is preferably 540 volts, and at tanks C and D 650 volts.

In Fig. 4 is shown a circuit diagram indicating a preferred manner of impressing these voltages. As shown, the positive terminal of the supply line is connected by conductor 50 to the copper roll 12 where the potential is impressed on the foil. The potential drop will occur largely at the surfaces of the foil in forming the film, for, the current passes through but a small thickness and a large area of electrolyte between the foil and the contiguous aluminum cathode 20A, 21A, 22A which latter together with the tank A is connected by conductor 51 to the negative terminal of the commercial power supply, illustratively of 220 volts.

A higher voltage of 540 volts is applied to tank B through a motor generator set, diagrammatically shown at 52, the positive terminal of which is connected by lead 53 to conductor 50 for application at the copper roll 12, and the negative terminal of which is connected by conductor 54 to the tank B and the cathode 20B, 21B, 22B therein.

Similarly tanks C and D are connected respectively through conductors 55 and 56 to the negative terminal of another motor generator set 57 giving an output of 650 volts, the positive terminal of which motor generator set is connected by conductor 58 to the lead 50 which passes to the copper roller 12.

In operation of the equipment, a continuous forming of the strip takes place, each segment of strip being successively subjected first to the power line voltage, then to the higher voltage of 540 volts in the second tank, then to the different electrolyte in the third tank under an applied voltage of 650 volts, and then to the more dilute electrolyte in the fourth tank under the same applied voltage. By this treatment a tough and permanent dielectric film is formed on both faces of the foil.

While I have in the foregoing, described a specific equipment and a specific method for producing foil suitable for condensers of a particular high voltage, it will be understood that the principle of the equipment and method of preforming foil can be carried out in numerous other applications with greater or lesser voltage.

For a clearer understanding of the invention in its true scope, reference will now be made to a number of the principles utilized in the preforming equipment and method as specifically set forth in the foregoing.

The use of the line voltage of 220 volts at the first tank brings about considerable economy in the cost of manufacturing equipment. Considerably more elaborate motor generator equipment would be required were the initial voltage higher than that taken from the commercial electric power and light circuit.

The major thickness of the thin film apparently is formed in the second tank B under the higher temperature of 200 to 212 degrees F. This is due to the high activity of the electrolyte under the high temperature involved. The electrolyte in tank B having no volatile constituent, has sufficient stability to operate effectively under such high temperature. While the film formed in tanks A and B is found to have a low leakage characteristic, it will however not withstand a voltage as high as 500 volts.

The use of the two different preforming electrolytes in succession in one continuous film-forming operation has resulted in a film, affording the desirable characteristics of each of the electrolytes and eliminating the disadvantages of each of the electrolytes. A condenser prepared from foil preformed in the manner set forth thus affords a film permanent and durable in character which satisfactorily operates on a voltage as high as 550 or even 600 volts, with a surprisingly low power factor and low leakage characteristic.

In determining the concentration and temperature of the electrolyte employed in this preforming operation two considerations are had in mind. The higher the concentration the more rapid the forming, but the less the voltage that the resulting product will withstand. Therefore, in certain of the tanks at least the maximum concentration of electrolyte is preferably selected that will withstand the voltage to be applied in that particular tank, thereby attaining maximum speed of formation for the particular voltage used.

The condenser unit shown in Fig. 5 is built up with the use of the formed foil from reel 35, 36 as the anode or as both electrodes as the case may be. Such unit preferably comprises the formed anode foil 60, a formed or unformed aluminum cathode foil 61 as the case may be, a composite interlay including a layer of gauze 63 and of thin paper 64 and a similar gauze 65 and paper 66 at the exterior surface of the anode, the superposed layers being rolled together as in Fig. 7. Anode and cathode tabs 67 and 68 respectively protrude from the respective electrodes.

The condenser rolls thus produced, with their anodes or both electrodes as the case may be, preformed according to the process previously described, are now immersed in a tank 70 containing electrolyte of high specific resistance with relatively low water content. This electrolyte is of the character of that described in the prior Georgiev Patent No. 1,815,768, and includes stoichiometric proportions of boric acid and ammonia with a substance including a polyhydroxy radical such as glycerol, glucose or ethylene glycol.

It is found that with an electrolyte of the type last described continued heating or ebullition causes the boiling temperature to increase, the breakdown voltage characteristic to increase, the capacity of the resulting condenser to slightly decrease and the power factor to increase the higher the boiling temperature of the electrolyte with which the condenser is impregnated.

The best results are obtained by critically heating the electrolyte in accordance with the operating voltage of the cell or condenser to be produced. In each case the electrolyte should be boiled for the minimum time that will produce the breakdown voltage characteristic required. For example, with the use of ethylene glycol electrolyte when used in the stoichiometric proportions preferred in the Georgiev patent above identified, boiling is carried on to a boiling point of 280° F. for a section formed to, say, 500 or 550 volts. Where the section is to be formed to only 300 volts the electrolyte is used with a boiling point of only 276° F. For 200 volts or lower, the electrolyte is used with a still lower boiling point of 270° F.

The condensers, after having been impregnated in the electrolyte, preboiled to the particular temperature suitable to the voltage of use of the condenser product are removed from the tank and, as indicated in Fig. 7, are formed. For this purpose the condenser terminals may be connected across the busbars 75 of a forming rack to apply thereto a voltage slightly in excess of the operating voltage of the condenser, this voltage being applied through a high ohmic resistance 76 in series with the condenser. After about six hours of such forming the condenser is complete and ready to be boxed or canned. Instead of forming in air, it will be understood that the condenser roll could be enclosed in its final can and the forming completed there.

It will be understood that for symmetrical condensers to be used on alternating current circuits, the same process may be employed, except that both electrodes would be preformed as indicated, in the apparatus of Figs. 1 to 3, and in the aging first one foil and then the other would have the film built thereon.

It is also understood that the method of forming the foils is applicable to wet types of cells or condensers, although by reason of the more substantial spacing between the electrodes in the wet type of apparatus, it is preferable to use as the final electrolyte a solution of considerably greater conductivity than that disclosed in the prior patent to Georgiev No. 1,815,768.

The apparatus shown in Fig. 1 is merely illustrative, it being understood that the operation could be carried out in a greater or lesser number of steps and to any voltage desired within the limits attainable and that I am not limited to the particular solutions described.

Where, for instance, the foil is to be preformed to a low voltage, say a voltage of less than 100 volts, it is sufficient to pass it through the apparatus under the applied commercial voltage of 220 volts or 110 volts but to increase the speed of feed of the foil. The faster the speed the less the time of preforming, and therefore, the lower the voltage which the product will withstand.

Where the preforming voltages are greatly in excess of the final operating voltage, the aging step may be dispensed with and the cell might have the non-aqueous electrolyte of the prior Georgiev patent incorporated therein without aging the same. For cells to be used at high operating voltage, aging is however preferably resorted to in any event.

It will thus be seen that there is herein described a method in which the several features of this invention are embodied and which method in its action attains the various objects of the invention and is well suited to meet the requirements of practical use.

As many changes could be made in the above method, and many apparently widely different embodiments of this invention could be made without departing from the scope thereof, it is intended that all matter contained in the above description or shown in the accompanying drawings shall be interpreted as illustrative and not in a limiting sense.

Having thus described my invention, what I claim as new and desire to secure by Letters Patent is:—

1. The method of forming an aluminum electrode which consists in subjecting the same to commercial direct current power line voltage in the presence of a film-forming electrolyte and thereupon subjecting the same to a higher voltage in the presence of a heated film-forming electrolyte stable under heat and finally impressing upon the electrolyte a still higher voltage, under less heat and in the presence of a second film-forming electrolyte more volatile in character but capable of building up a film under such higher voltage.

2. The method of forming an aluminum electrode which consists in impressing a voltage thereon in the presence of an electrolyte including as a substantial ingredient thereof borax and boric acid and thereupon impressing thereon a higher voltage in the presence of an electrolyte including as a substantial ingredient thereof boric acid and ammonia water.

3. The method of forming an aluminum electrode which consists in impressing a voltage thereon in the presence of an electrolyte including as a substantial ingredient thereof borax and boric acid, and thereupon impressing thereon a higher voltage in the presence of an electrolyte including as a substantial ingredient thereof ammonium borate.

4. The method of forming an aluminum electrode which consists in impressing a voltage thereon in the presence of an electrolyte including as a substantial ingredient thereof borax and boric acid, and thereupon impressing thereon a higher voltage in the presence of an electrolyte including as a substantial ingredient thereof ammonium borate, said latter electrolyte being substantially in the proportion of 120 grams of boric acid and 14 cc. of 26 per cent ammonia water, to one hundred liters of distilled water.

5. The method of forming an aluminum electrode which consists in submerging the same in an electrolyte comprising a dilute solution of borax and boric acid, applying thereto a line voltage of 220 volts, then applying a voltage at least twice as high, then subjecting the thus far formed electrode to another electrolyte including as a substantial ingredient thereof ammonium borate and applying thereto a still higher voltage.

6. The method of forming an aluminum electrode which consists in submerging the same in an electrolyte comprising a dilute solution of borax and boric acid, applying thereto a line voltage of 220 volts, then applying a voltage at least twice as high, then subjecting the thus far formed electrode to another electrolyte including as a substantial ingredient thereof ammonium borate and applying thereto a still higher voltage, and finally subjecting the electrode to further forming operation in the presence of a more dilute body of the latter electrolyte.

7. The method of forming aluminum electrode stock for use in electrolytic cells, which consists in impressing voltage thereon in the presence of an aqueous film-forming sodium salt solution at one voltage, and thereupon in the presence of an aqueous film-forming ammonium salt solution at higher voltage, the forming with said latter electrolyte being conducted in two steps, the second step at a somewhat higher voltage than the first and with a somewhat greater dilution of electrolyte.

8. The method of forming aluminum electrode material for electrolytic cells which consists in impressing thereon line voltage of 220 volts D. C. in the presence of an aqueous solution of borax and boric acid, then applying thereto a materially higher voltage in the presence of the same solution, and thereupon subjecting the electrode thus far formed to an aqueous solution of boric acid and ammonia water, and impressing thereupon a still higher voltage, and finally impressing an even greater voltage on the thus formed electrode in the presence of a more dilute body of the latter electrolyte.

9. The method of producing a condenser capable of operating under a given voltage, which method includes the step of combining polyhydroxy alcohol and alkali borate and controlling the water ingredient of the resulting electrolyte to afford a boiling point thereof which is substantially the lowest that will withstand the voltage of use of the condenser, and then aging the condenser with said electrolyte.

10. The method of producing a condenser capable of operating under a given voltage, which method includes the step of heating an electrolyte solution including polyhydroxy radicals, to drive off sufficient of the water ingredient until the boiling point of the residue is substantially the lowest that will withstand the voltage of use of the condenser and then aging the condenser with said electrolyte.

11. The method of producing a condenser capable of operating under a given voltage, which method includes the step of treating an electrolyte solution including glycerin and an alkali salt to drive off sufficient of the water ingredient until the boiling point of the residue is substantially the lowest that will withstand the voltage of use of the condenser and then aging the condenser with said electrolyte.

12. The method of producing a condenser capable of operating under a given voltage, which method includes the step of treating an electrolyte solution including glycol and an alkali borate, to drive off sufficient of the water ingredient until the boiling point of the residue is substantially the lowest that will withstand the voltage of use of the condenser and then aging the condenser with said electrolyte.

13. The method of producing a condenser capable of operating under a given voltage, which method includes the step of treating an electrolyte solution including glucose and an alkali borate to drive off sufficient of the water ingredient until the boiling point of the residue is substantially the lowest that will withstand the voltage of use of the condenser and then aging the condenser with said electrolyte.

14. The method of forming an electrolytic condenser of the type comprising electrodes and interposed spacer means, which consists in driving off water from electrolyte including polyhydroxy radicals and a water constituent until the boiling point of the electrolyte is the lowest useful for the operating voltage of the condenser, and then impregnating the condenser with said electrolyte and applying current to the condenser in the presence of the electrolyte incorporated in the completed condenser.

15. The method of producing an electrolytic condenser which consists in producing a dielectric film on a strip of aluminum by applying voltage thereto in the presence of an aqueous film-forming electrolyte under a maximum voltage in excess of the operating voltage of the condenser, then constructing the condenser utilizing said formed aluminum strips and using in the assembled condenser unit an electrolyte including polyhydroxy radicals and having substantially the maximum water content to withstand impressed voltage corresponding approximately to the operating voltage of the condenser.

16. The method of forming an electrolytic condenser which consists in forming the foil for the anode in aqueous electrolyte under progressively higher voltages to a degree such as to withstand a voltage in excess of the operating voltage of the completed condenser, assembling the condenser with the electrodes contiguous to each other and incorporating between the electrodes an electrolyte including polyhydroxy, alkali and borate radicals, said incorporated electrolyte having a boiling point such as to be capable of withstanding a voltage not substantially higher than the peak operating voltage of the condenser.

17. The method of forming an electrolytic condenser which consists in forming the foil for the anode in aqueous electrolyte under progressively higher voltages to a maximum in excess of the operating voltage of the completed condenser, assembling the condenser with the electrodes contiguous to each other and incorporating therebetween an electrolyte including polyhydroxy radicals and capable of withstanding a maximum voltage substantially equal to the operating voltage of the condenser.

18. The method of forming an electrolytic condenser which consists in forming the foil for the anode in aqueous electrolyte under progressively higher voltages to a maximum considerably in excess of the operating voltage of the completed condenser, assembling the condenser with the electrodes contiguous to each other, heating an electrolyte having polyhydroxy radicals and a water constituent until the boiling point is at substantially the minimum value capable of withstanding the voltage of use of the condenser, incorporating the said electrolyte in the condenser structure and forming the condenser to slightly in excess of the operating voltage thereof.

19. The method of preparing an electrolytic condenser, which consists in impressing electric potential upon aluminum foil in the presence of a sodium salt solution under successively higher voltages, and then continuing the forming in the presence of ammonium salt solution at still higher voltages, and assembling the condenser with said formed aluminum as anodes, incorporating in the condenser an electrolyte having polyhydroxy radicals and a small water content after heating said latter electrolyte to a degree to impart thereto substantially the minimum boiling point to withstand the operative voltage of the finished condenser.

20. The method of forming aluminum stock with a dielectric film by a continuous operation to produce a resulting film, which consists in continuously running a long strip of aluminum successively through electrolytes of different characteristics while impressing on the section in each electrolyte a voltage suitable to it and maintaining the temperature of said electrolyte at a predetermined value, the concentration of certain of said electrolytes being substantially the maximum capable of withstanding the voltage there applied.

21. The method of forming aluminum stock with a dielectric film by a continuous operation to produce a resulting film of low leakage and low power factor and high voltage characteristic, which consists in continuously running a long strip of aluminum foil successively through electrolytes of different characteristics while impressing on the section of the foil in each electrolyte a voltage suitable to it and maintaining the temperature of said electrolyte at a predetermined value, the concentration of certain of said electrolytes being substantially the maximum to withstand the voltage there applied.

22. The method of forming an aluminum electrode which consists in impressing a voltage thereon in the presence of an electrolyte comprising a relatively concentrated aqueous solution of borax and boric acid, and thereupon impressing thereon a higher voltage in the presence of an electrolyte comprising a relatively dilute aqueous solution of ammonium borate.

23. The method set forth in claim 22, in which the treatment in the ammonium borate solution is performed in two successive steps, the first in a solution including 120 grams of boric acid and 14 c. c. of 26% of ammonia water to 100 liters of distilled water, and the second with the same amounts of boric acid and ammonia water in 200 liters of distilled water.

24. The method of forming electrode metal for electrolytic condensers which consists in passing the metal through a succession of electrolyte baths and applying to each bath a substantially constant voltage, the voltages at some baths differing from the voltages at others, the concentration of one or more of said baths being the maximum capable of withstanding the voltage there applied.

25. The method of forming electrode metal for electrolytic condensers which consists in passing the metal through a succession of electrolyte baths and applying to each bath a substantially constant voltage, the voltages at some baths differing from the voltages at others, the voltage applied to at least some of said baths being substantially the highest capable of being withstood without excessive breakdown of the dielectric film on the electrode metal.

26. The method which consists in passing electrode metal through a number of electrolyte baths of substantially identical composition but different concentrations, the first of said baths being more concentrated than the last, and applying a substantially fixed voltage at each bath.

27. The method of forming aluminum foil for electrolytic condensers which consists in passing the foil through a succession of electrolyte baths, some of said baths having substantially identical electrolytes but different applied voltages, other of said baths having electrolytes substantially identical but of different concentrations and having applied thereto substantially the same voltage.

HOWARD E. RHODES.